United States Patent
Axmon et al.

(10) Patent No.: US 10,321,389 B2
(45) Date of Patent: Jun. 11, 2019

(54) NETWORK SEARCHING

(71) Applicant: Telefonaktiebolaget LM Ericsson (publ), Stockholm (SE)

(72) Inventors: Joakim Axmon, Malmo (SE); Marten Akerman, Lund (SE); Ali Nader, Malmo (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 15/514,314

(22) PCT Filed: Sep. 25, 2014

(86) PCT No.: PCT/EP2014/070570
§ 371 (c)(1),
(2) Date: Mar. 24, 2017

(87) PCT Pub. No.: WO2016/045740
PCT Pub. Date: Mar. 31, 2016

(65) Prior Publication Data
US 2017/0280379 A1    Sep. 28, 2017

(51) Int. Cl.
*H04W 72/00* (2009.01)
*H04W 48/16* (2009.01)
(Continued)

(52) U.S. Cl.
CPC ........ *H04W 48/16* (2013.01); *H04W 16/18* (2013.01); *H04W 48/14* (2013.01); *H04W 88/06* (2013.01)

(58) Field of Classification Search
USPC ..... 370/350, 329, 328; 455/434, 417, 452.2; 342/235.31
See application file for complete search history.

(56) References Cited

U.S. PATENT DOCUMENTS 9,014,169 B2 *   4/2015   Lindoff ............... H04W 48/16
                                                              370/350
9,730,149 B2 *   8/2017   Feng .................. H04W 48/16
(Continued)

FOREIGN PATENT DOCUMENTS

GB          2495985 A      5/2013
WO       2009120137 A1    10/2009
(Continued)

OTHER PUBLICATIONS

PCT International Search Report, dated May 26, 2015, in connection with International Application No. PCT/EP2014/070570, all pages.
(Continued)

*Primary Examiner* — David Q Nguyen
(74) *Attorney, Agent, or Firm* — Leffler Intellectual Property Law, PLLC

(57) ABSTRACT

A mobile RF communication device configured for dual SIM operation and configured to send a request for search data relevant to the second SIM module to a server, said request including an identifier for a first cell associated with the first operator; receive a response from said server, said response including a correlation for said first cell and search data for a second cell associated with the second operator, the search data including an identifier for the second cell; and adapt a network searching strategy for the second RF modem based on the correlated search data.

18 Claims, 9 Drawing Sheets

(51) Int. Cl.
*H04W 48/14* (2009.01)
*H04W 16/18* (2009.01)
*H04W 88/06* (2009.01)

(56) References Cited

U.S. PATENT DOCUMENTS

| | | |
|---|---|---|
| 2007/0082698 A1 | 4/2007 | Su |
| 2009/0116448 A1 | 5/2009 | Nam et al. |
| 2010/0075716 A1 | 3/2010 | Chang et al. |
| 2011/0117909 A1 | 5/2011 | Cao et al. |
| 2011/0261777 A1* | 10/2011 | Maeda .................. H04W 48/20 370/329 |
| 2012/0050098 A1* | 3/2012 | Kuehnel ............... G01S 5/0242 342/357.31 |
| 2012/0135715 A1* | 5/2012 | Kang .................... H04W 8/183 455/412.1 |
| 2013/0005290 A1 | 1/2013 | Geary et al. |
| 2013/0064176 A1 | 3/2013 | Hsu et al. |
| 2013/0150032 A1* | 6/2013 | Pattaswamy ...... H04W 52/0229 455/434 |
| 2013/0157662 A1 | 6/2013 | Han et al. |
| 2013/0303203 A1 | 11/2013 | Wang et al. |
| 2014/0071891 A1* | 3/2014 | Zhou .................... H04J 11/0069 370/328 |
| 2015/0230070 A1* | 8/2015 | Kadiyala ................. H04W 4/16 455/417 |
| 2015/0327159 A1* | 11/2015 | Gude .................... H04W 48/18 455/434 |
| 2015/0358979 A1* | 12/2015 | Puranik ............... H04W 72/085 455/452.2 |
| 2016/0073316 A1* | 3/2016 | Calcev ................. H04W 36/30 370/332 |

FOREIGN PATENT DOCUMENTS

| | | |
|---|---|---|
| WO | 2013029672 A1 | 3/2013 |
| WO | 2013136125 A1 | 9/2013 |

OTHER PUBLICATIONS

PCT Written Opinion, dated May 26, 2015, in connection with International Application No. PCT/EP2014/070570, all pages.
3GPP TSG-RAN WG2#67bis, R2-095977, Oct. 12-16, 2009, Miyazaki, Japan, Qualcomm Europe (Rapporteur), [67#25] UMTS: Inbound mobility, 27 pages.
3GPP TSG-RAN WG2 meeting #62-bis, R2-083569, Warsaw, Poland, Jun. 30-Jul. 4, 2008, Qualcomm Europe (Email rapporteur), Email discussion summary: [62_LTE_C02] Home eNB inbound mobility support: Remaining issues, 3 pages.

* cited by examiner

NETWORK SEARCHING

TECHNICAL FIELD

This application relates to a method, a server, a radio frequency communication device, and a computer-readable storage medium for improved network searching, and in particular to a method, a server, a radio frequency communication device and a computer-readable storage medium for improved network searching in Dual SIM devices.

BACKGROUND

A mobile radio frequency communication device is by definition mobile and as such it will have to connect to different base stations as it is moved. To find which base station to connect to, the mobile RF communication device has to perform network searches. And as it is highly beneficial to perform so called soft handovers to hard handovers, many network searches are necessary to be able to pre-empt any break in network coverage. Also, if the mobile RF communication device happens to lose its connection it shall continue to search until a network can be found. Such searches are performed by scanning frequency bands until a carrier that is associated with a service subscription for the mobile RF communication device is found and connected to.

As the searches are to be performed on a wide frequency spectrum and also until a connection is reestablished, a lot of battery power is used for these network searches.

Attempts have been made to reduce the number and extent of the network searches by storing and consulting the history of the mobile RF communication device, that is which cells has the mobile RF communication device been connected to previously.

Such solutions suffer from a drawback that they are only relying on the history of a single mobile RF communication device and that they also require continuous network searching to find a lost connection, albeit at a narrower spectrum.

Therefore, there is a need for a method and a mobile RF communication device that limits the network searching so that battery power may be preserved.

SUMMARY

The problem, that the inventors has realized after inventive and insightful reasoning and that the present invention aims to solve, arises because as there is no network coverage, the mobile radio frequency (RF) communication device is unable to communicate with any other devices and thus relevant information can not be shared in real time. However, by utilizing a Dual SIM access to two operators, base stations being serviced by one operator may be used to provide information on the base stations being serviced by another operator.

It is an object of the teachings of this application to overcome or at least mitigate the problems listed above by providing a mobile RF communication device comprising a radio frequency communications interface and a controller, said radio frequency communications interface comprising at least a first RF module connected to a first SIM module configured for receiving a first SIM card associated with a first operator and a first RF module connected to a second SIM module configured for receiving a second SIM card associated with a second operator, wherein said mobile RF communication device is configured for dual SIM operation and wherein said controller is configured to: send a request for search data relevant to the second SIM module to a server, said request including an identifier for a first cell associated with the first operator; receive a response from said server, said response including a correlation for said first cell and search data for a second cell associated with the second operator, the search data including an identifier for the second cell; and adapt a network searching strategy for the second RF modem based on the correlated search data.

In one embodiment the mobile radio frequency communication device is a mobile communications terminal.

It is a further object of the teachings of this application to overcome the problems listed above by providing a method for use in a mobile radio frequency communication device according to above, the method comprising sending a request for search data relevant to the second SIM module to a server, said request including an identifier for a first cell associated with the first operator; receiving a response from said server, said response including a correlation for said first cell and search data for a second cell associated with the second operator, the search data including an identifier for the second cell; and adapting a network searching strategy for the second RF modem based on the correlated search data.

It is an object of the teachings of this application to overcome or at least mitigate the problems listed above by providing a server for storing a correlation between a first cell associated with a first operator and a second cell associated with a second operator, wherein the server comprises a memory configured for said storing and a controller, wherein said controller is configured to receive a report from a mobile RF communication device, the report including an identifier for said first cell and search data associated with the second cell, and store the search data associated with the second cell as a correlation to the identifier for said first cell, wherein the first cell is associated with a first operator and the second cell is associated with a second operator.

It is a further object of the teachings of this application to overcome the problems listed above by providing a method for use in a server according to above, the method comprising receiving a report from a mobile RF communication device, the report including an identifier for said first cell and an identifier for said second cell, and storing the search data associated with the second cell as a correlation to the identifier for said first cell, wherein the first cell is associated with a first operator and the second cell is associated with a second operator.

It is a further object of the teachings of this application to overcome the problems listed above by providing a computer readable medium comprising instructions that when loaded into and executed by a controller, such as a processor, cause the execution of a method according to herein.

The inventors of the present application have realized, after inventive and insightful reasoning, that by generating and maintaining a correlation of cells from one operator with cells from another operator a dual SIM device can find information on which base station to search for (and when) for one operator, based on information such as the currently camped on cell, for another operator and thereby significantly reduced the number and scope of needed network searches by a simple server request. This reduces both the time and also the power needed for searching.

Other features and advantages of the disclosed embodiments will appear from the attached detailed disclosure.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
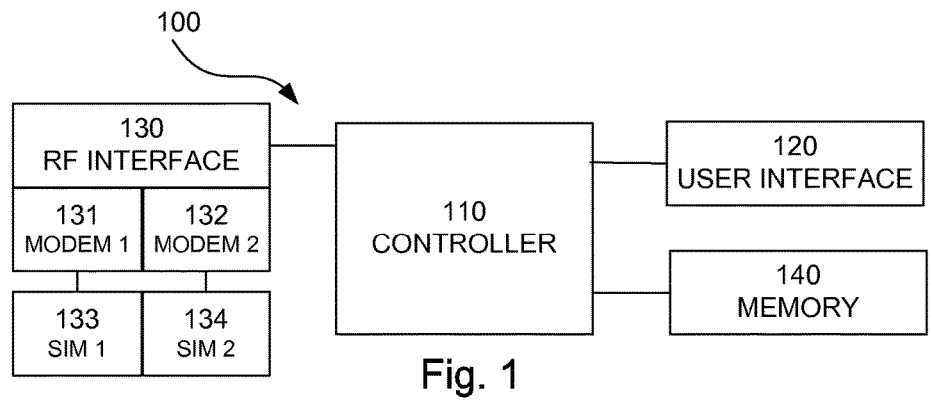
FIG. 1 shows a schematic view of a radio frequency communication device according to one embodiment of the teachings of this application.

FIG. 1 shows a schematic example of a radio frequency (RF) communication device 100 according to one embodiment of the teachings herein. In this example, the mobile RF communication device 100 is a mobile communications terminal, such as a mobile phone, a wireless computer tablet or a laptop computer enabled for wireless communication, also commonly referred to as User Equipment (UE), but it should be noted that the teachings herein are not restricted to be used in mobile communications terminals, but may be used in any mobile RF communication device 100 that is arranged as will be disclosed herein. The mobile RF communication device 100 may comprise a user interface 120, which in the example embodiment of FIG. 1 may comprise at least one physical key, a visual data feedback unit, such as a display or Light Emitting Diode (LED) array. The mobile RF communication device 100 also comprises a controller 110 and a memory 140. The controller 110 may be implemented as one or several processors or other logic circuits, such as programmable logic circuits. The memory 140 may be implemented using any commonly known technology for computer-readable memories such as ROM, RAM, SRAM, DRAM, FLASH, DDR, EEPROM memory, flash memory, hard drive, optical storage or any combination thereof. The memory 140 is used for various purposes by the controller 110, such as for storing program instructions and application data.

The mobile RF communication device 100 further comprises a radio frequency (RF) communication interface 130 which is configured to communicate according to one or a combination of the standards Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards.

The RF interface comprises two (or more) RF modems, a first RF modem and a second RF modem 131, 132. In one embodiment the first and the second RF modems 131, 132 may be logical modems being implemented as logical parts of the same physical RF transmitter.

Each RF modem 131, 132 is operably connected to a SIM (Subscriber Identity Module) module. The first RF modem 131 being connected to a first SIM module 133 and the second RF modem 132 being connected to a second SIM module 134. The SIM modules 133, 134 are configured to read and write data from and to a SIM card. The SIM modules 133, 134 may not have a direct connection with the RF modems 131,132, but the connection may be over a common data bus (not shown explicitly) and/or the controller 110. Each SIM card is associated with a cellular service subscription and in one embodiment the first SIM card is associated with a first operator and the second SIM card is associated with a second operator. In one embodiment, the first SIM card is associated with a 3G or 4G subscription and the second SIM card is associated with a 2G subscription. In one embodiment, the first SIM card is associated with a 2G, 3G or 4G subscription and the second SIM card is associated with a 2G, 3G or 4G subscription. The function of a SIM module is known to a skilled person and will not be disclosed in further details.

The mobile RF communication device 100 is thus arranged to operate with dual SIM cards. Dual SIM card operation may be effected as both cards being, or rather the subscriptions corresponding to the SIM cards, active at the same time (both capable of transmitting simultaneously) or as both cards being in standby at the same time, but as one card is active in communication, the other card may not be active. This is commonly referred to as DSDA (Dual SIM Dual Active) and DSDS (Dual SIM Dual Standby) respectively.

In this specification the term dual is intended to comprise two or more; e.g. multiple SIM cards or USIM may be accommodated in the mobile RF communication device 100.

The RF interface 130 may also be configured to communicate according to one or a combination of at least one of the standards IEEE 802.11 (WiFi), Bluetooth®, NFC (Near Field Communication) or other short range (radio frequency) communication interface, RFID (Radio Frequency Identification) and ZigBee.

The controller 110 is operatively connected to the RF communication interface 130 for communicating with other mobile RF communication devices as will be disclosed below with reference to FIG. 3.

Figure 2:
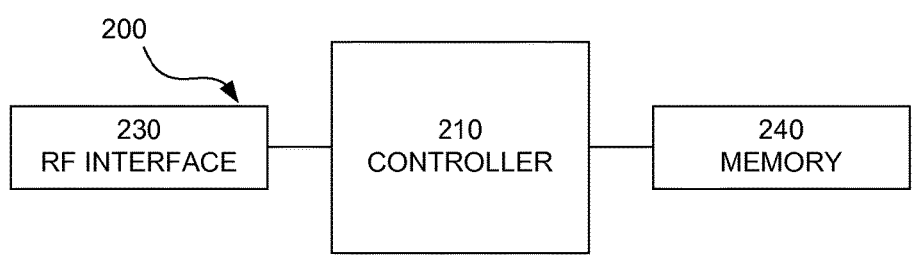
FIG. 2 shows a schematic view of a network node according to one embodiment of the teachings of this application.

FIG. 2 shows a schematic example of a correlations server 200 according to one embodiment of the teachings herein. In this example, the correlations server 200 is implemented in a base station, but it should be noted that the teachings herein are not restricted to be used in base stations, but the server may also be arranged at other places, for example as a standalone server or a higher level server, such as a gateway or core network or other operator server.

The correlations server 200 comprises a controller 210 and a memory 240. The controller 210 may be implemented as one or several processors or other logic circuits, such as programmable logic circuits. The memory 240 may be implemented using any commonly known technology for computer-readable memories such as ROM, RAM, SRAM, DRAM, FLASH, DDR, EEPROM memory, flash memory, hard drive, optical storage or any combination thereof. The memory 240 is used for various purposes by the controller 210, such as for storing program instructions and application data.

The correlations server 200 may further comprise or be connected to a radio frequency (RF) communication interface 230 which is configured to communicate according to one or a combination of the standards Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards. The correlations server 200 may be connected to the RF interface 230 remotely through a series of network connections, such as through the internet.

The controller 210 is operatively connected to the RF communication interface 230 for communicating with mobile RF communication devices as will be disclosed below with reference to FIG. 3.

Figure 3:
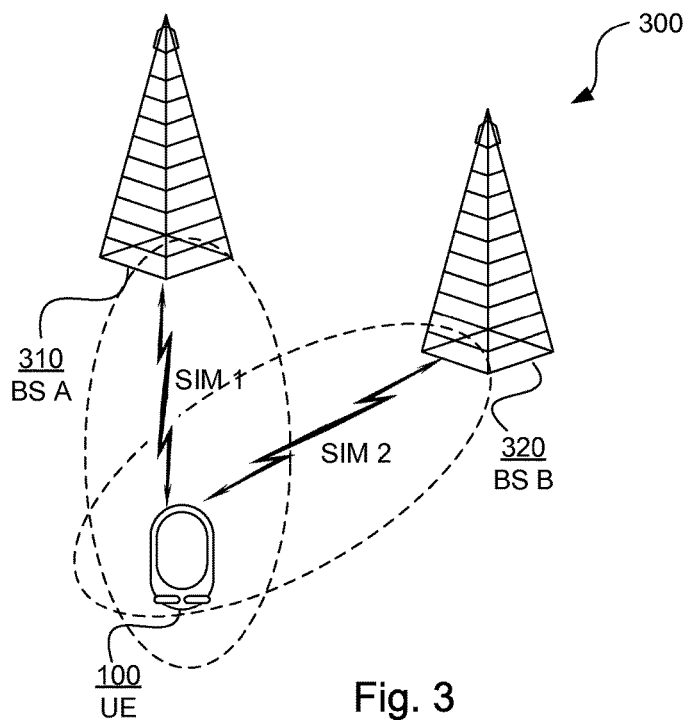
FIG. 3 shows a schematic view of a general dual SIM communication network according to one embodiment of the teachings of this application.

FIG. 3 schematically shows a radio frequency communication network 300 according to the teachings herein. A first base station 310 is arranged to communicate with a mobile RF communication device 100 according to FIG. 1, such as a user equipment (UE). The base station 310 may be arranged to communicate according to a cellular communication standard, such as LTE (Long-Term evolution) or 3GPP (3G Partner Project), GSM (Global System Mobile) or other commonly known radio access technology (RAT), such as disclosed with reference to FIG. 2. The first base station 310 is arranged to communicate with the mobile RF communication device 100 according to the subscription of the first SIM card SIM 1 as indicated by the dashed arrow. In one embodiment the first SIM card is associated with a first operator A which operates the first base station 310 (as indicated by the abbreviation BS A in FIG. 3). As is indicated by the dashed oval emanating from the first base station 310, the mobile RF communication device 100 is within the coverage of the first base station 310 to which it is connected. In the terminology of relevant standards, the mobile RF communication device 100 is camping on the cell of the first base station 310.

The communication network 300 further comprises a second base station 320 which is arranged to communicate with the mobile RF communication device 100 according to the subscription of the second SIM card SIM 2 as indicated by the dashed arrow. In one embodiment the second SIM card is associated with a second operator B which operates the second base station 320 (as indicated by the abbreviation BS B in FIG. 3). As is indicated by the dashed oval emanating from the second base station 320, the mobile RF communication device 100 is within the coverage of the second base station 320 to which it is connected. In layman's terms, the mobile RF communication device 100 is camping on the cell of the second base station 320.

Figure 4:
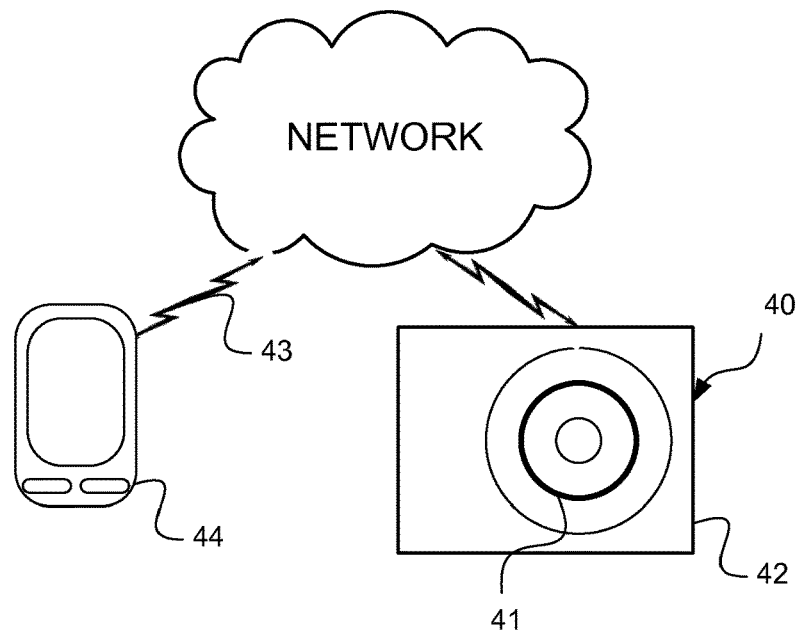
FIG. 4 shows a schematic view of a computer-readable medium according to one embodiment of the teachings of this application.

FIG. 4 shows a schematic view of a computer-readable medium as described in the above. The computer-readable medium 40 is in this embodiment a data disc 40. In one embodiment the data disc 40 is a magnetic data storage disc. The data disc 40 is configured to carry instructions 41 that when loaded into a controller, such as a processor, executes a method or procedure according to the embodiments disclosed above. The data disc 40 is arranged to be connected to or within and read by a reading device 42, for loading the instructions into the controller. One such example of a reading device 42 in combination with one (or several) data disc(s) 40 is a hard drive. It should be noted that the computer-readable medium can also be other mediums such as compact discs, digital video discs, flash memories or other memory technologies commonly used.

The instructions 41 may also be downloaded to a computer data reading device 44, such as a computer or other device capable of reading computer coded data on a computer-readable medium, by comprising the instructions 41 in a computer-readable signal 43 which is transmitted via a wireless (or wired) interface (for example via the Internet) to the computer data reading device 44 for loading the instructions 41 into a controller. In such an embodiment the computer-readable signal 43 is one type of a computer-readable medium 40.

The instructions may be stored in a memory (not shown explicitly in FIG. 4, but referenced 240 in FIG. 2) of the mobile RF communication device 100.

References to computer programs, instructions, code etc. should be understood to encompass software for a programmable processor or firmware such as, for example, the programmable content of a hardware device whether instructions for a processor, or configuration settings for a fixed-function device, gate array or programmable logic device etc.

The inventors of the teachings herein have realized that by utilizing the dual connectivity one connection can be managed or planned via the other connection. To provide such planning or management capabilities a server is provided for correlating a location of a mobile RF communication device 100 when camping on a cell for the first operator A, with a base station 320 for the second operator B. Of course, it would also be possible to provide a correlation with more than two operators A, B, C, D etc. The location of the mobile RF communication device 100 is, in one embodiment, given by the cell identifier for the base station which the mobile RF communication device 100 is currently camping on.

Figure 5:
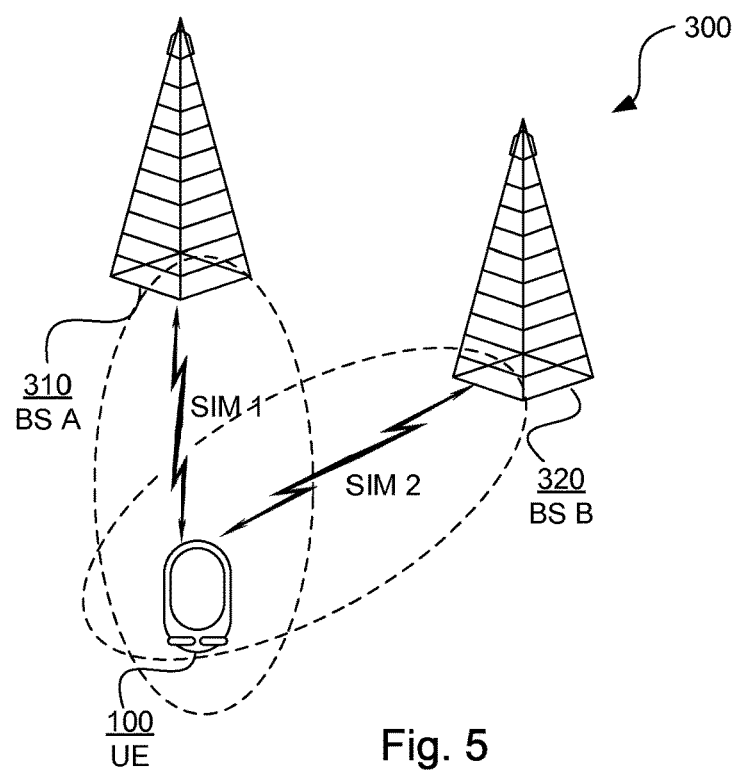
FIG. 5 shows schematic view of a communication network according to one embodiment of the teachings of this application.

FIG. 5 shows a schematic view of a RF communication network 300 according to the teachings herein where the first base station 310 is configured to relay communication between the mobile RF communication device 100 and a correlations server 200. The correlations server 200 is configured to store a correlation (such as a table) of cell locations of one operator and base stations of another operator(s). The correlation may be for a cell location to an operator, to a carrier or to a specific base station indicated by a frequency. The cell location may be indicated by the Cell Global Identity (CGI) of the cell.

The correlations server 200 may be operated by an operator (as in FIG. 5), a by mobile RF communication device 100 manufacturer or provider or by third party service provider.

It should be noted that in one embodiment, the correlations server 200 may be incorporated in the mobile RF communication device 100 as an application or as a database stored in the memory 140 of the mobile RF communication device 100. In such an embodiment, the mobile RF communication device 100 does not need to transmit any requests via the first base station 310, but may simply perform a look up in its own memory 140.

Should the mobile RF communication device 100 be in a situation where it has no connection (or a bad connection) with a second base station 320 of the second operator B, the mobile RF communication device 100 is configured to transmit a request for base stations 320 whose coverage the mobile RF communication device 100 is currently within to the correlations server 200, for example via the first base station 310. The correlations server 200 receives the request which indicates a cell identifier A1, A2, A3, . . . , or other location information, and finds any correlated base stations B2, B4, . . . for the second operator (or also for additional operators C3, D2, C2, . . . ). The (list of) correlated base station(s) is transmitted back to the mobile RF communication device 100, possibly via the first base station 310, and as the mobile RF communication device 100 receives the (list of) correlated base station(s), the mobile RF communication device 100 can target a scan for the correlated base station(s) and does not have to scan the entire frequency spectra for all available RATs and carriers and can adapt its network search strategy accordingly. As transmitting a single request and receiving the response is much more efficient both in terms of time and power, the mobile RF communication device 100 may find a base station to connect to much faster (on average) and while saving power. The use of such a server query is thus highly beneficial.

As is indicated in FIG. 5, a cell for the first operator A may not correspond to any base station of the second operator B, and in such a case, the mobile RF communication device 100 is thereby informed that there is no point in trying to scan for a base station as there are no base stations to be found being serviced by the second operator B.

The correlations stored by the correlations server 200 may be provided by mobile RF communication devices regularly or during an initial buildup period. For the embodiment where the correlations server 200 is implemented in the mobile RF communication device 100, the correlations are stored by the mobile RF communication device 100 itself regularly or during a buildup.

The mobile RF communication device 100 is thus configured to scan for other carriers or cells when it is camping on a cell and report those other carriers to the correlations server 200. The CGI of the other cells and indicators such as signal strength may be transmitted along with the report. The mobile RF communication device 100 may perform such reporting on its own volition or the mobile RF communication device 100 may receive a request to perform such reporting from the first base station 310, for example when it connects to the first base station 310. The request to report on neighbors may also be specific to a number of CGIs, i.e. the correlations server 200 may request the mobile RF communication device 100 to report on CGIs specified in a list.

The mobile RF communication device 100 may be configured to report continuously as data on neighboring cells is collected or it may configured to buffer data on neighboring cells and then report regularly, when the buffer is full and/or upon receiving a prompt from the correlations server 200.

The report that is transmitted may include the CGI of the currently camped on cell and any CGI of other carriers found and also possibly associated information such as RAT, signal strength, carrier information, physical cell identity, estimated distance to other cell, trail of visited cells before ending up in the currently camped on cell. In one embodiment the mobile RF communication device 100 may be configured to include information on any handovers or cell re-selections in the trail. By including the trail, a mobile RF communication device 100 may be given a possibility to proactively plan for which cell to search for in the future for operator B by keeping track of and comparing its cell trail for operator A.

The correlations server 200 is thus configured to maintain a mapping or correlation between a cell for one operator (and possibly one RAT) and cell(s) for another operator(s). The server is also configured to prompt or request that the mobile RF communication device 100 start logging and/or start reporting.

As the correlations server 200 receives a report from a mobile RF communication device 100 it is, in one embodiment, configured to determine whether the report is trustworthy or not, that is, does it come from a trustworthy source and is it in the right format. The correlations server 200 may determine the trustworthiness or solidity of a report by comparing an identifier of the reporting mobile RF communication device 100 to a list of known (and cleared) mobile RF communication devices 100.

The correlations server 200 may determine the solidity of a report by determining if any of the reported CGIs or associated information is outside normal ranges. Normal ranges may be defined as within normal operating parameters or within parameters received in previous reports such as reported by other mobile RF communication devices.

To safeguard against malicious or erroneous reporting, the correlations server 200 may also be configured to hold off on storing the information in a received report until it has received a number of other reports, preferably from other mobile RF communication devices, reporting similar data. Similar data may be defined as data that is within an error margin of data or average of data reported by other mobile RF communication devices, the reported data possibly including previous reports from the same mobile RF communication device 100.

To safeguard against continuous bad reporting, the correlations server 200 may also be configured to determine that one mobile RF communication device 100 is reporting inconsistent data, and if so not prompt the mobile RF communication device 100 for future reports and also to discard any reports received from that mobile RF communication device 100.

The correlations server 200 may also be configured to prompt several mobile RF communication devices 100 to report on cell correlations during an initial or build-up phase to populate a correlations data base, and as the correlations data base has been properly populated (all cells have a solid correlation), then only prompt a few mobile RF communication devices to continue reporting.

In an embodiment where the correlations server 200 is implemented in the mobile RF communication device 100, the mobile RF communication device 100 will be configured to continuously or at least regularly report on collected data to keep the correlations data base up to date and adapted to changes in the network environment.

Figure 6:
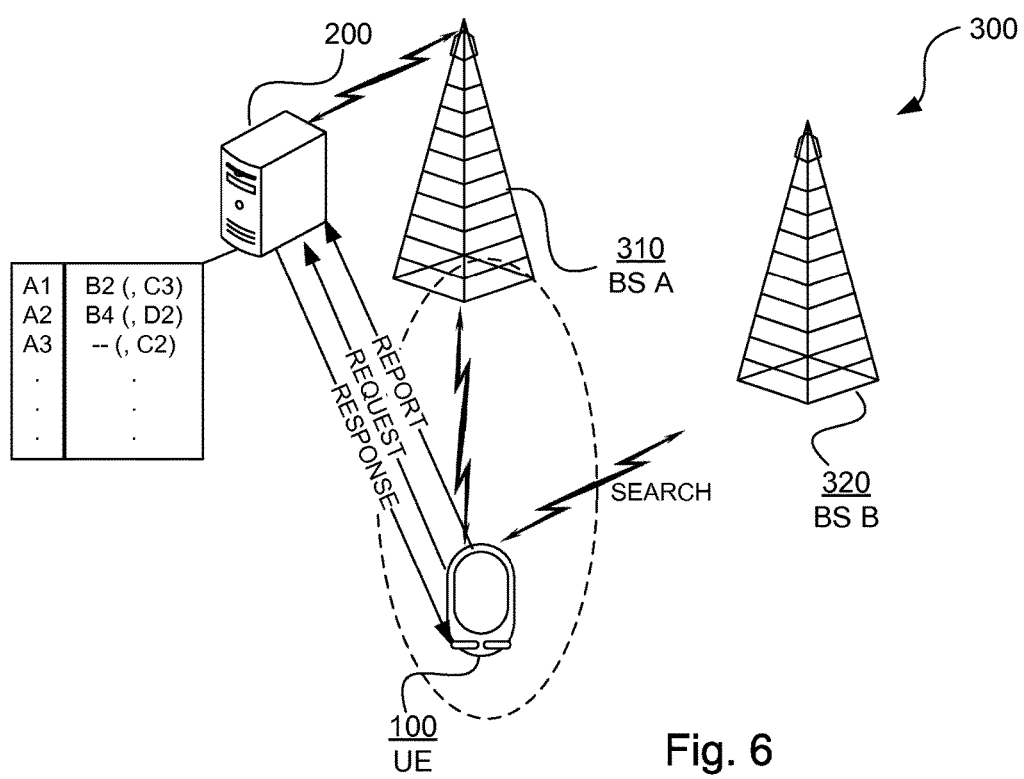
FIG. 6 shows schematic view of a communication network according to one embodiment of the teachings of this application.
Figures 7, 8:
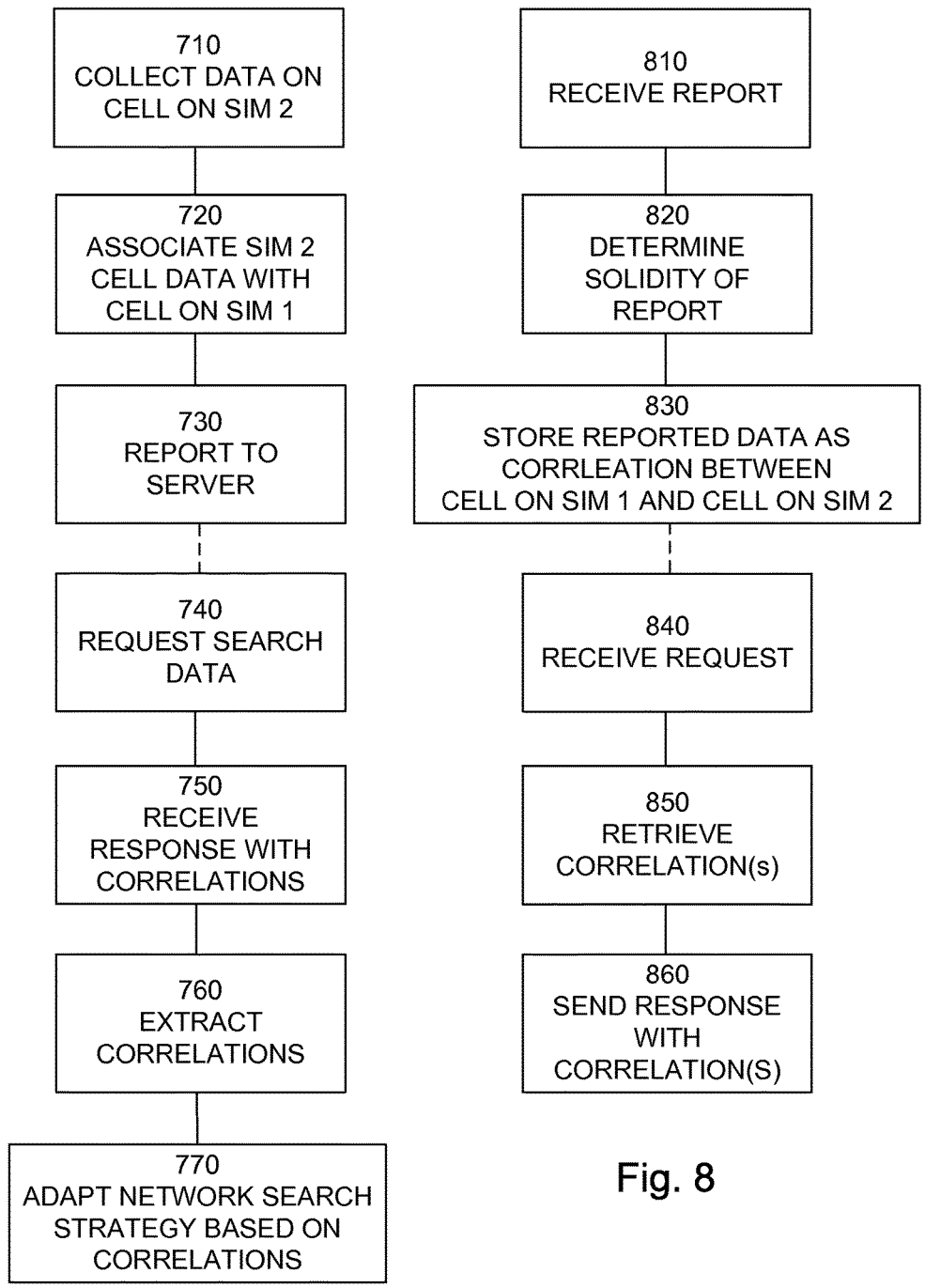
FIG. 7 shows a flow chart for a general method for a mobile RF communication device according to an embodiment of the teachings of this application.
FIG. 8 shows a flow chart for a general method for a correlations server according to an embodiment of the teachings of this application.

The operation of the mobile RF communication device 100 and the correlations server 200 will now be described with simultaneous reference to FIG. 6 being a schematic view of a communication network according to the teachings herein and FIGS. 7 and 8 being flowchart for a general method according to the teachings herein for a mobile RF communication device 100 and a correlations server 200 respectively.

The mobile RF communication device 100 is configured to collect 710 data or information (for example signal strength) on both operators through the corresponding SIM modules 131, 133 and to associate 720 the data collected through the first SIM module 131, with the second base station 320 (or cell) camped on by the second SIM module 132 and report 730 this to the correlations server 200, possibly through the first SIM module 131 of the RF interface 130—and, vice-versa, to associate 720 the data collected through the second SIM module 132, with the first base station 310 (or cell) camped on by the first SIM module 131 and report 730 this to the correlations server 200, possibly through the second SIM module 132 of the RF interface 130.

The correlations server 200 is configured to receive 810 a report from a mobile RF communication device 100 and to determine the solidity 820 of the report. If the report is determined to be solid, the data in the report is stored 830 as a correlation between a first cell (camped on by SIM 1) serviced by the first operator A through the first base station 310 and any other cell reported on, such as a cell serviced by the second operator B through the second base station 320.

As a mobile RF communication device 100 is to perform a network search it prompts the correlations server 200 for identities on cells to search for by sending a request 740 to the correlations server 200, possibly through the first SIM module 131. The request includes the CGI of the cell currently camped on. The request may also include information on a specific carrier or operator that the mobile RF communication device 100 is looking to connect to. In one embodiment the mobile RF communication device 100 includes the CGI in the request. In one embodiment the first base station 310 includes the CGI in the request.

The correlations server 200 receives the request 840 including the CGI of the cell that the mobile RF communication device 100 is currently camped on and retrieves 850 any correlations and possibly associated correlated search data stored for that cell. The correlations server 200 then transmits 850 a correlations response including the correlation(s) and possibly the correlated search data to the mobile RF communication device 100. In an embodiment where the request includes a specific operator or carrier, only correlations relevant to that operator or carrier is transmitted.

The mobile RF communication device 100 receives 750 the correlations response, extracts 760 the correlations and correlated search data and adapts 770 its network search strategy accordingly possibly based on the correlated search data.

In one embodiment the correlated data only includes the identifier CGI for the second cell and the mobile RF communication device 100 is configured to retrieve other search data based on the identifier, for example by querying a network server.

The correlated search data may include carrier information on where to find neighboring cells for the other operator(s), such as a frequency (or frequency span) on which the mobile RF communication device 100 should search for a carrier on and/or indications on the modulation used by the carrier searched for.

The teachings herein will now be exemplified through a series of exemplary embodiments offering more details on individual features disclosed in the above and also on additional features.

Figure 9:
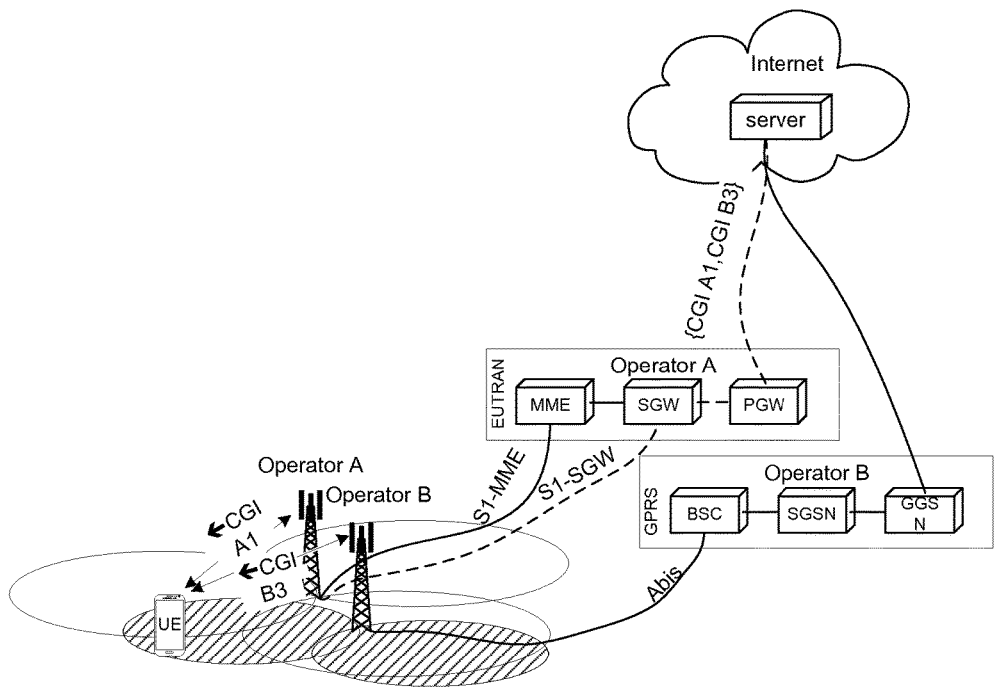
FIG. 9 shows schematic view of a communication network according to one embodiment of the teachings of this application.

FIG. 9 shows a schematic view of a communications network according to herein, wherein a mobile RF communication device in DSDA or DSDS operation which is in network coverage for SIM1 associated with Operator A and SIM2 associated with Operator B. The radio access networks are LTE and GSM, respectively. The core networks differ between the radio access technologies, and there is no connection between the operators' core networks. However, both core networks allow the mobile RF communication device 100 to connect to internet and thus to a proprietary correlations server 200 in the cloud.

The mobile RF communication device 100 knows the CGI of the cells it is connected to or camping on, and can combine the information on which CGIs it is connected to simultaneously. It can further acquire information from e.g. the LTE cell on neighbor carriers as acquired from measurements (hence confirmed carriers) or acquired from system information.

The mobile RF communication device 100 sends information on the CGIs of the cells to which it is connected to simultaneously along with information on intra-frequency carrier, inter-frequency carriers, and inter-RAT carriers. It can further provide additional information allowing the correlations server 200 to better determine where geographically the mobile RF communication device 100 is located, for instance (but not limited to): mobility measurements, derived distance from the cell center, and/or UE trail, i.e. last visited cell before reselecting or being handed over to the current cell, allowing finger-printing of where the information is applicable.

The correlations server 200 receives the information from the mobile RF communication device 100 and checks that it is a solicited report (i.e., initiation of collection of information on mobile RF communication device side) and that the carrier information is consistent with information it has received from other mobile RF communication devices. It then stores the carrier information in a database. The information is stored in such way that given CGI B3 in Operator B's network (and potentially additional information for finger-printing), one can retrieve the carrier information applicable for the cell with CGI A1 in Operator A's network.

Figure 10:
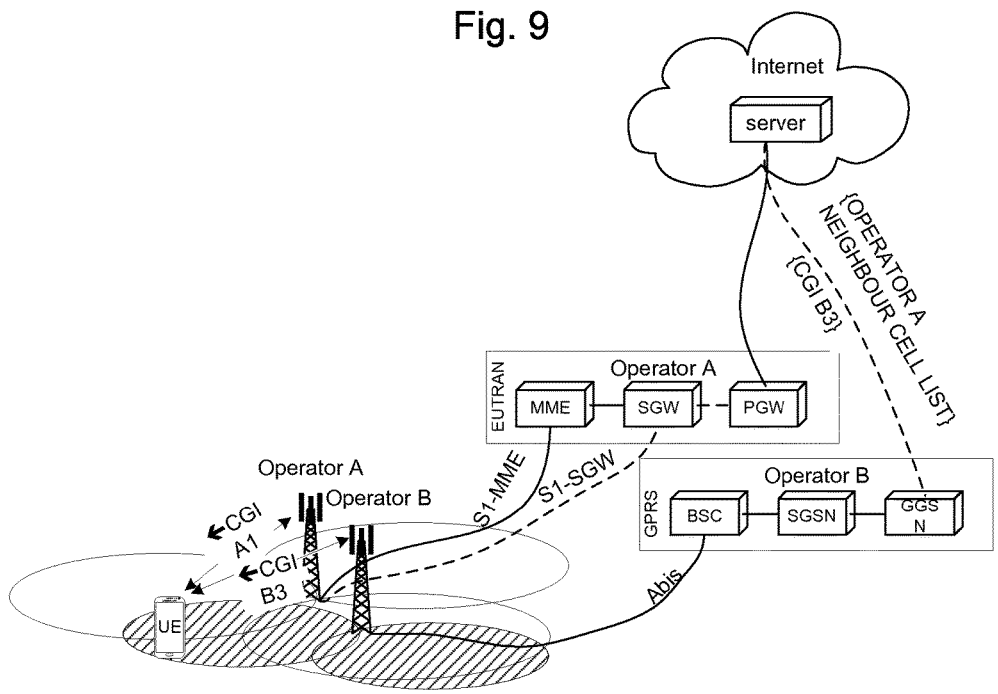
FIG. 10 shows schematic view of a communication network according to one embodiment of the teachings of this application.

Corresponding carrier information for Operator B's cell with CGI B3 can be collected in similar fashion by mobile RF communication device's having SIM combinations that support 4G/3G/2G for Operator B instead of Operator A. Moreover, for either SIM combination the GSM neighbor cells (carriers) can be collected and sent to the correlations server 200. It shall be noted that in some major networks the legacy RATs have little information on newer RATs, i.e., GSM might not provide information on LTE carriers, but LTE provides information on GSM carriers. The reason may for instance be that the operator(s) have been reluctant to invest/upgrade the GSM network FIG. 10 shows a schematic view of a communications network according to herein wherein a mobile RF communication device 100 in DSDA or DSDS operation that is unaware of the coverage for Operator A.

The mobile RF communication device 100 is camping on or connected to Operator B's cell with CGI B3, but is unaware of cells or carriers for Operator A.

The mobile RF communication device 100 contacts the proprietary correlations server 200, and provides the CGI of the cell it camps on/is connected to (B3), and also information on that it is interested in information related to coverage for Operator A (operator e.g. deduced from PLMN(s)). It may also provide additional information to allow finger-printing to be used by the correlations server 200 to further tailor the information to the location where the mobile RF communication device 100 resides.

The mobile RF communication device 100 checks which of Operator A's cell(s) are associated with Operator B's cell, and fetches information from the database on carriers where coverage for Operator A can be found.

The information is sent by the correlations server 200 to the mobile RF communication device 100, which upon receiving the information immediately can search for cells on the relevant carriers and thereby can save time and power by avoiding scanning all or a subset of the supported bands.

The examples above are just illustrations of the idea. For instance, the information provided to the mobile RF communication device 100 may be applicable to a wider area, e.g. a tracking area or a subset thereof.

Further it shall be noted that once the mobile RF communication device 100 has found coverage, further mobility will be handled based on system information or handover commands provided by the serving cell(s). The correlations server 200 is just consulted when the mobile RF communication device 100 has lost coverage for either of the SIMs, e.g. due to receiving a call in the DSDS case while driving, or experiencing spotty coverage during DSDS or DSDA operation.

Figure 11:
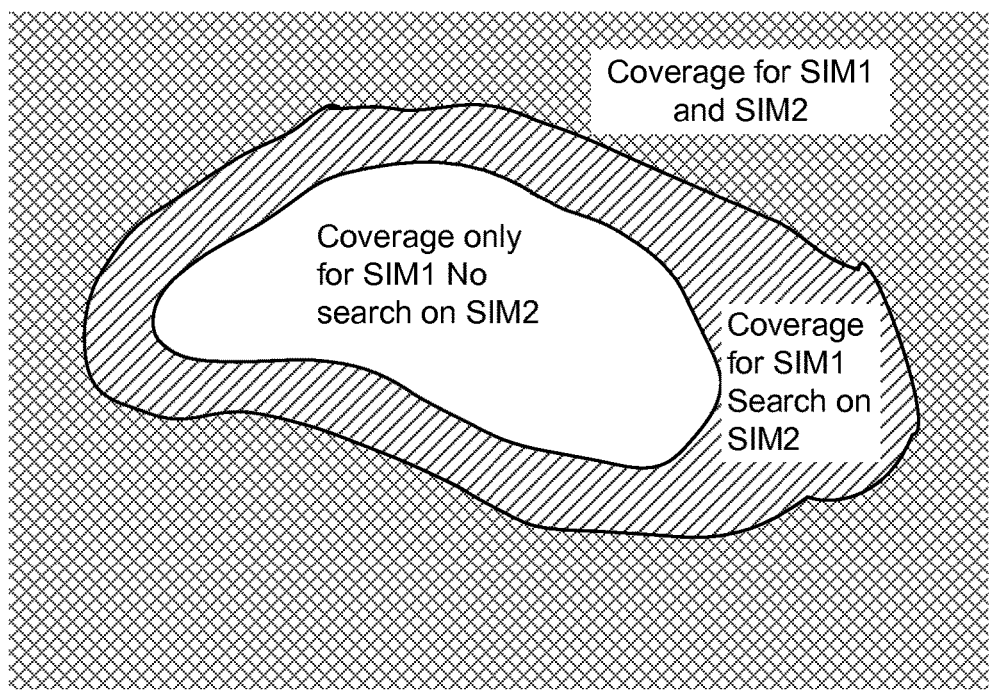
FIG. 11 shows a schematic coverage for a mobile communications network.

FIG. 11 shows a hypothetical coverage map, where some areas lack coverage for SIM2 (Operator B) and only have coverage for SIM1 (Operator A). In a further extension of the invention, the mobile RF communication device 100 may get information from the correlations server 200 on where to find coverage for Operator B, and may further get information on where there are coverage holes. Hence, the mobile RF communication device 100 can decide not to search for cells for Operator B while in coverage of particular cells from Operator A, i.e. in the white area in the figure above. When it enters any of Operator A's cells that overlap at least partially with coverage for Operator B, it triggers the mobile RF communication device 100 to start searching for cells associated with Operator B. This way it can be avoided to have mobile RF communication devices wasting power on searching for non-existent coverage.

Figure 12:
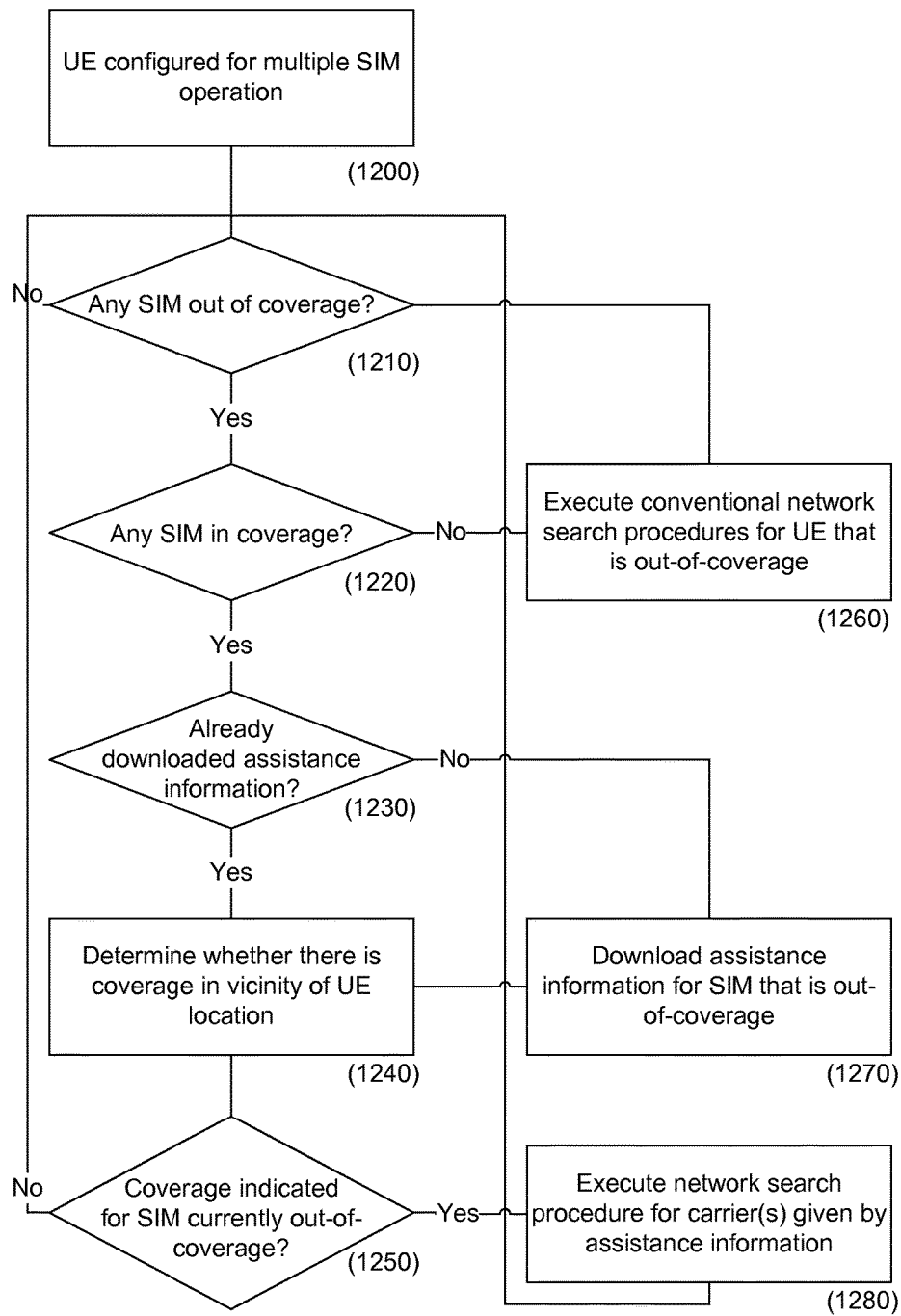
FIG. 12 shows a flow chart for a general method for a mobile RF communication device according to an embodiment of the teachings of this application.

FIG. 12 shows a flowchart for a method according to the teachings herein where a mobile RF communication device 100 losing coverage for one of the SIMs and using assistance information to decide whether and on which carriers to search for cells.

The mobile RF communication device 100 is configured 1200 for operation with two or more SIMs. In case coverage is lost for one of the SIMs (1210;YES), and at least one other SIM has coverage (1220;YES), the mobile RF communication device 100 checks whether assistance information already has been downloaded for the area—where area is defined by the cells and/or e.g. tracking area associated with the SIM with coverage (1230). If assistance information has not yet been acquired (1230;NO), the mobile RF communication device 100 contacts the correlations server 200 to get carrier information for the SIM(s) that is/are out-of-coverage (1270). Then the mobile RF communication device 100 determines whether any coverage can be expected at the location of the mobile RF communication device 100 (1240). As described above, this can be based on finger-printing, serving cell identity, etc.

If it is determined that it is likely that the mobile RF communication device 100 is within coverage for any of the carriers for the SIM(s) that currently is/are in the state out-of-coverage (1250;YES), the mobile RF communication device 100 executes a network search using the provided carrier information. Particularly, it is limiting its search activities to the specified carriers and does not search on other carriers (1280).

Figure 13:
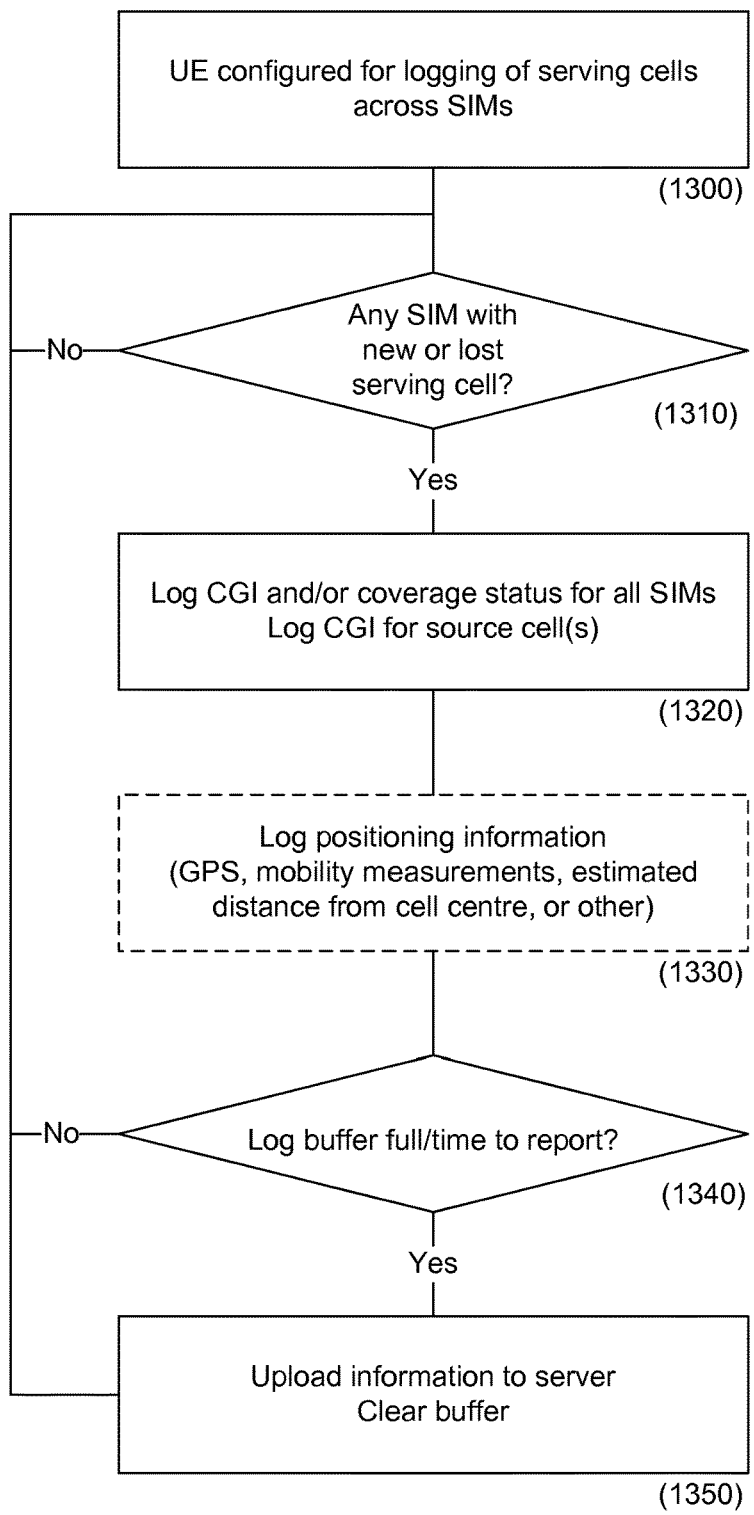
FIG. 13 shows a flow chart for a general method for a mobile RF communication device according to an embodiment of the teachings of this application.

FIG. 13 shows a flowchart where a mobile RF communication device 100 is configured by a correlations server 200 to log and associate serving cells across SIMs. The mobile RF communication device 100 has been configured by the correlations server 200 to log the serving cells to which it is connected to or camping on concurrently and also whether any of the SIMs is out of coverage (1300).

In case any of the serving cells change (cell selection, cell reselection, handover, cell change order), or any of the SIMs loses coverage (1310;YES), the mobile RF communication device 100 logs CGI for all serving cells, physical cell identities, carrier information (ARFCN, UARFCN, EARFCN), and coverage status in case there is no serving cell for one or more of the SIMs (1320). Additionally, the mobile RF communication device 100 may log information to be used for finger-printing by which the correlations server 200 will have better information on where in the area the serving cell was changed or lost (1330). The information used for finger-printing may, for instance, comprise any or a combination of (but not limited to): GPS coordinates, and/or Mobility measurements (signal strength, carrier information, physical cell identity of neighbor cells), and/or Estimated distance from cell center, and/or mobile RF communication device trail (visited cell(s) before ending up in the current cell(s)).

With this information the correlations server 200 can provide tailored carrier information on finer granularity than just which cell the mobile RF communication device 100 is camping on or connected to for the SIM(s) with coverage.

When the log buffer is full or the mobile RF communication device 100 otherwise is triggered to send a report (1340;YES), it contacts the correlations server 200 and uploads the logged information and clears the log buffer (1350).

It shall be noted that only a very small number of mobile RF communication devices occasionally will be configured by the correlations server 200 to acquire this information. Once initial information has been stored by the correlations server 200, the correlations server 200 only occasionally configures a few selected mobile RF communication devices to collect information to refresh the database.

Figure 14:
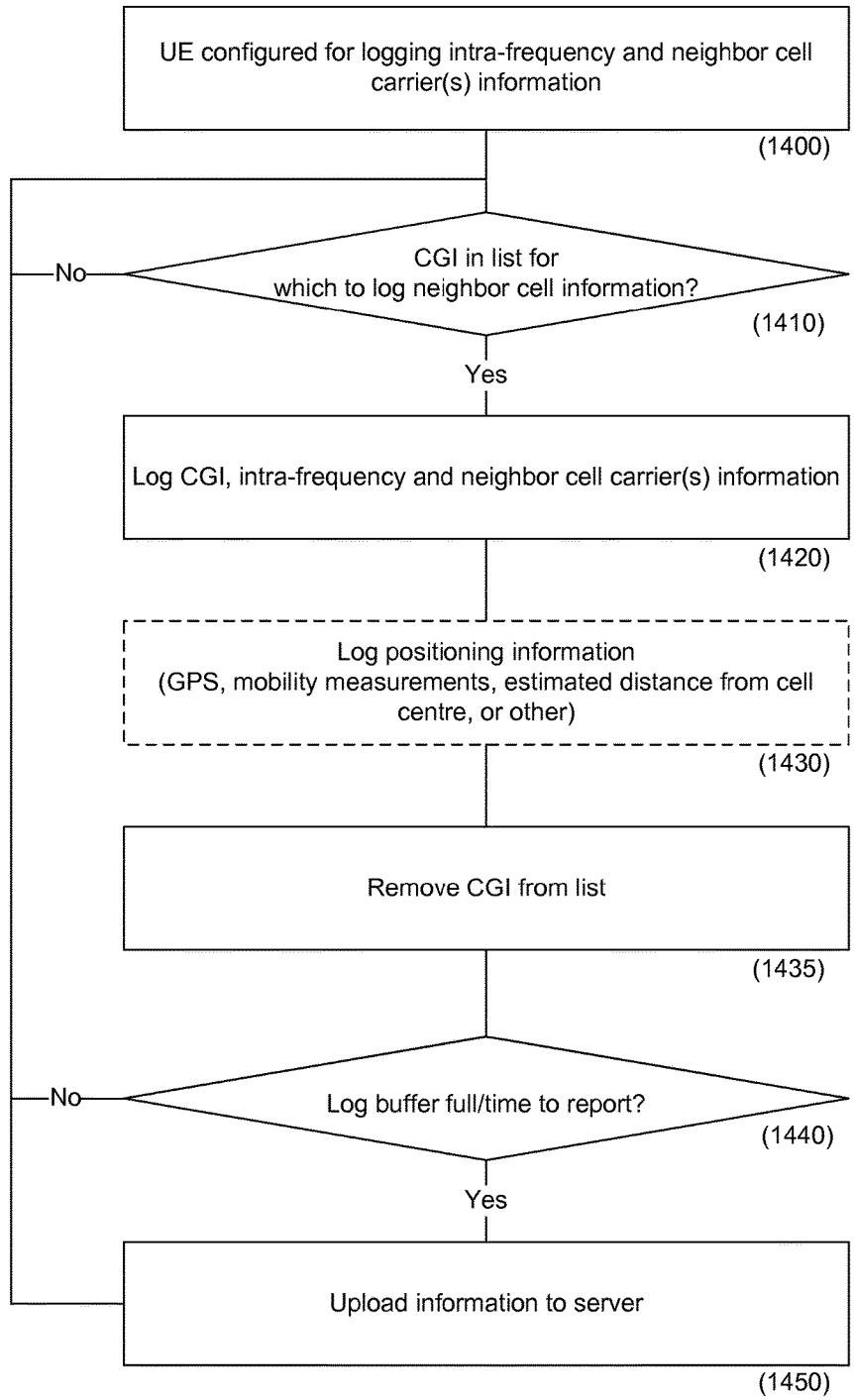
FIG. 14 shows a flow chart for a general method for a mobile RF communication device according to an embodiment of the teachings of this application.

FIG. 14 shows a flowchart for a mobile RF communication device 100 logging intra-frequency, inter-frequency and inter-RAT carriers. The mobile RF communication device 100 has been configured to log intra-frequency, inter-frequency and inter-RAT carriers for a list of serving cells, each identified by their CGI (1400). When the mobile RF communication device 100 encounters (camps on or is connected to) a serving cell in the configured CGI list (1410;YES), it logs information both on the intra-frequency carrier, and on neighbor carriers (inter-frequency and/or inter-RAT) (1420). This information may either be acquired from the system information (e.g. LTE SIBs 3-7) or be based on actual mobility measurements, or a combination thereof, where the carrier information is based on the system information, with additional status indication on whether cells have been detected on each respective carrier. Additionally, the mobile RF communication device 100 may log positioning information similar to Embodiment 2 (1430). The positioning information can be particularly useful in combination with status information since here the status may vary depending on where in the cell the mobile RF communication device 100 is located. It is less interesting if only reporting carriers based on system information, since such information is common for the whole cell, regardless of mobile RF communication device 100 location.

Once the mobile RF communication device 100 has logged such information for the serving cell, it removes the corresponding CGI from the configured list in order not to log the same information multiple times (1435).

When the log buffer is full, the CGI list is empty, a timer expires, or the mobile RF communication device 100 for instance anyway is connecting to the correlations server 200 (1440;YES), it uploads the carrier information to the correlations server 200 (1450).

It shall be noted that only a very small number of mobile RF communication devices occasionally will be configured by the correlations server 200 to acquire this information. Once initial information has been stored by the correlations server 200, the correlations server 200 only occasionally configures a few selected mobile RF communication devices to collect information to refresh the database.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mobile RF communication device comprising:
   a radio frequency communications interface; and
   a controller,
   wherein said radio frequency communications interface comprises: at least a first RF modem connected to a first SIM module configured for receiving a first SIM card associated with a first operator and a second RF modem connected to a second SIM module configured for receiving a second SIM card associated with a second operator, wherein said mobile RF communication device is configured for dual SIM operation and wherein said controller is configured to:
   send a request for search data relevant to the second SIM module to a server, said request including an identifier for a first cell associated with the first operator;
   receive a response from said server, said response including correlated search data comprising information about one or more other cells associated with the second operator, wherein inclusion of the information about each of said one or more other cells in the response is based on a correlation between each of said one or more other cells and said first cell, and the information includes search data for said one or more other cells; and
   when the correlated search data comprises an identifier for a second cell associated with the second operator, respond by adapting a network searching strategy for the second RF modem based on the correlated search data.

2. The mobile RF communication device according to claim 1, wherein the controller is further configured to send the request through radio frequency interface.

3. The mobile RF communication device according to claim 1, wherein the first cell is a cell that the radio frequency communications interface is currently connected to through the first RF modem.

4. The mobile RF communication device according to claim 1, wherein the correlated search data includes a frequency to be searched for a correlated second cell.

5. The mobile RF communication device according to claim 1, wherein said controller is further configured to determine that the response does not contain any information about correlated other cells and if so, adapt the network searching strategy by postponing a search and transmit a second request to said server.

6. The mobile RF communication device according to claim 1, wherein said controller is further configured to send a report to said server, the report including an identifier for the first cell associated with the first operator and an identifier for the second cell associated with the second operator and search data associated with the second cell, causing the server to store a correlation between said first cell and said second cell and the search data associated with the second cell.

7. The mobile RF communication device according to claim 6, wherein said controller is further configured to receive a prompt from the server and in response thereto send the report.

8. The mobile RF communication device according to claim 6, wherein the controller is further configured to send the report through radio frequency interface.

9. The mobile RF communication device according to claim 1, further comprising a server application for storing a correlation between said first cell and said second cell, wherein the server application is configured to:
   receive a report, the report including an identifier for said first cell and search data associated with the second cell, and
   cause storage of the search data associated with the second cell as a correlation to the identifier for said first cell, wherein the first cell is associated with a first operator and the second cell is associated with a second operator.

10. A method for use in a mobile RF communication device comprising a radio frequency communications interface and a controller, said radio frequency communications interface comprising at least a first RF modem connected to a first SIM module configured for receiving a first SIM card associated with a first operator and a second RF modem connected to a second SIM module configured for receiving a second SIM card associated with a second operator, wherein said mobile RF communication device is configured for dual SIM operation and wherein said method comprises:
   sending a request for search data relevant to the second SIM module to a server, said request including an identifier for a first cell associated with the first operator;
   receiving a response from said server, said response including correlated search data comprising information about one or more other cells associated with the second operator, wherein inclusion of the information about each of said one or more other cells in the response is based on a correlation between each of said one or more other cells and said first cell, and the information includes search data for said one or more other cells; and
   when the correlated search data comprises an identifier for a second cell associated with the second operator, responding by adapting a network searching strategy for the second RF modem based on the correlated search data.

11. A server for storing a correlation between a first cell associated with a first operator and a second cell associated with a second operator, wherein the server comprises a memory configured for said storing and a controller, wherein said controller is configured to:
  receive a report from a mobile RF communication device configured for dual SIM operation, the report including an identifier for said first cell and search data associated with the second cell, and
  cause storage of the search data associated with the second cell as correlated search data related to the identifier for said first cell, wherein the first cell is associated with a first operator and the second cell is associated with a second operator,
wherein said controller is further configured to:
  receive a request from a mobile RF communication device, said request including an identifier for the first cell;
  retrieve the correlated search data associated with the second cell; and
  send a response to the mobile RF communication device, the response including the correlated search data associated with the second cell, the search data including an identifier for the second cell.

12. The server according to claim 11, wherein said controller is further configured to send a prompt to the mobile RF communication device prompting said mobile RF communication device for a report.

13. The server according to claim 11, wherein said controller is further configured to determine the solidity of the report by comparing an identifier of the mobile RF communication device to a list of mobile RF communication devices.

14. The server according to claim 11, wherein said controller is further configured to determine the solidity of the report by determining if any of the identifiers included in the report or associated information is within normal ranges, such as normal operating parameters or within parameters received in previous reports.

15. The server according to claim 11, wherein said controller is further configured to determine that the report is within an error margin of previously received reports and if so, store the search data associated with the second cell as a correlation to the identifier for said first cell.

16. The server according to claim 11, wherein a functionality of the server is implemented as an application in a mobile RF communications device.

17. A method for use in a server for storing a correlation between said first cell associated with a first operator and said second cell associated with a second operator, wherein the server comprises a memory configured for said storing and a controller, wherein the method comprises:
  receiving a report from a mobile RF communication device configured for dual SIM operation, the report including an identifier for said first cell and an identifier for said second cell; and
  storing the search data associated with the second cell as correlated search data related to the identifier for said first cell, wherein the first cell is associated with a first operator and the second cell is associated with a second operator,
wherein the method further comprises:
  receiving a request from a mobile RF communication device, said request including an identifier for the first cell;
  retrieving the correlated search data associated with the second cell; and
  sending a response to the mobile RF communication device, the response including the correlated search data associated with the second cell, the search data including an identifier for the second cell.

18. A nontransitory computer readable storage medium encoded with instructions that, when loaded and executed on a processor, causes the processor to perform a method for use in a mobile RF communication device comprising a radio frequency communications interface and a controller, said radio frequency communications interface comprising at least a first RF modem connected to a first SIM module configured for receiving a first SIM card associated with a first operator and a second RF modem connected to a second SIM module configured for receiving a second SIM card associated with a second operator, wherein said mobile RF communication device is configured for dual SIM operation and wherein said method comprises:
  sending a request for search data relevant to the second SIM module to a server, said request including an identifier for a first cell associated with the first operator;
  receiving a response from said server, said response including correlated search data comprising information about one or more other cells associated with the second operator, wherein inclusion of the information about each of said one or more other cells in the response is based on a correlation between each of said one or more other cells and said first cell, and the information includes search data for said one or more other cells; and
when the correlated search data comprises an identifier for a second cell associated with the second operator, responding by adapting a network searching strategy for the second RF modem based on the correlated search data.

* * * * *